(12) United States Patent
Hecht

(10) Patent No.: US 10,217,108 B1
(45) Date of Patent: Feb. 26, 2019

(54) SYSTEMS AND METHODS FOR ASSISTED TRANSACTIONS USING AN INFORMATION WALLET

(71) Applicant: Wells Fargo Bank, N.A., San Francisco, CA (US)

(72) Inventor: Al Hecht, San Francisco, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 599 days.

(21) Appl. No.: 14/195,161

(22) Filed: Mar. 3, 2014

Related U.S. Application Data

(60) Provisional application No. 61/806,686, filed on Mar. 29, 2013, provisional application No. 61/922,468, filed on Dec. 31, 2013.

(51) Int. Cl.
*G06Q 40/00* (2012.01)
*G06Q 20/36* (2012.01)

(52) U.S. Cl.
CPC .................. *G06Q 20/363* (2013.01)

(58) Field of Classification Search
CPC ..................................... G06Q 40/00
USPC ...................................... 705/35, 38
See application file for complete search history.

(56) References Cited

U.S. PATENT DOCUMENTS

| | | | |
|---|---|---|---|
| 5,521,815 A | 5/1996 | Rose, Jr. | |
| 5,978,774 A | 11/1999 | Rogers et al. | |
| 6,085,172 A | 7/2000 | Junger | |
| 6,587,835 B1 | 7/2003 | Treyz et al. | |
| 6,850,902 B1 | 2/2005 | Finch | |
| 6,898,598 B2 | 5/2005 | Himmel et al. | |
| 6,912,507 B1 | 6/2005 | Phillips et al. | |
| 6,934,686 B1 | 8/2005 | Rajagopalan | |
| 7,099,850 B1* | 8/2006 | Mann, II | G06Q 20/16 380/28 |
| 7,162,451 B2 | 1/2007 | Berger et al. | |
| 7,266,533 B2 | 9/2007 | Karas et al. | |
| 7,343,551 B1 | 3/2008 | Bourdev | |
| 7,689,508 B2* | 3/2010 | Davis | G06Q 20/10 455/406 |

(Continued)

OTHER PUBLICATIONS

Non-Final Office Action for U.S. Appl. No. 14/195,297 dated Jul. 12, 2016. 18 pages.

(Continued)

*Primary Examiner* — Kirsten S Apple
(74) *Attorney, Agent, or Firm* — Foley & Lardner LLP

(57) ABSTRACT

A system includes an information wallet account associated with a user of the system, and a server having a memory and a processor. The processor is configured to receive a request for information, wherein the requested information is associated with the user, and retrieve a stored portion of the requested information from the information wallet account. If a portion of the requested information is not found within the information wallet account, the processor is configured to send a request for a remaining portion of the requested information to a user computing device of the user. The processor is also configured to send the requested information to an entity computing system associated with the entity as part of a transaction between the user and the entity, receive feedback from the entity computing system based on the transaction, and send an alert to the user computing system based on the feedback.

11 Claims, 8 Drawing Sheets

(56) References Cited

U.S. PATENT DOCUMENTS

| | | | |
|---|---|---|---|
| 7,778,934 B2 | 8/2010 | Graves et al. | |
| 7,991,652 B2 | 8/2011 | Chamberlain | |
| 8,117,444 B2 | 2/2012 | Takatori et al. | |
| 8,260,806 B2 | 9/2012 | Steele et al. | |
| 8,452,654 B1* | 5/2013 | Wooters | G06Q 30/0234 705/14.34 |
| 8,583,549 B1* | 11/2013 | Mohsenzadeh | G06Q 20/227 705/38 |
| 8,606,640 B2* | 12/2013 | Brody | G06Q 20/0655 705/26.1 |
| 8,612,349 B1 | 12/2013 | Ledder et al. | |
| 8,646,060 B1 | 2/2014 | Ben Ayed | |
| 8,825,757 B2 | 9/2014 | Lunt et al. | |
| 2001/0053980 A1 | 12/2001 | Suliman et al. | |
| 2002/0179704 A1 | 12/2002 | Deaton | |
| 2003/0028427 A1 | 2/2003 | Dutta et al. | |
| 2003/0046237 A1* | 3/2003 | Uberti | G06Q 20/02 705/44 |
| 2003/0130907 A1 | 7/2003 | Karas et al. | |
| 2004/0122685 A1* | 6/2004 | Bunce | G06Q 20/04 705/67 |
| 2005/0097320 A1 | 5/2005 | Golan et al. | |
| 2005/0210263 A1 | 9/2005 | Levas et al. | |
| 2005/0250538 A1* | 11/2005 | Narasimhan | G06Q 20/12 455/558 |
| 2006/0026097 A1* | 2/2006 | Nethery, III | G06Q 20/102 705/40 |
| 2006/0208065 A1* | 9/2006 | Mendelovich | G06Q 20/04 235/380 |
| 2006/0259380 A1 | 11/2006 | Milstein et al. | |
| 2007/0051795 A1* | 3/2007 | Shipman | G06Q 20/102 235/379 |
| 2007/0162338 A1 | 7/2007 | Lawe | |
| 2007/0255564 A1* | 11/2007 | Yee | G10L 17/24 704/246 |
| 2008/0010190 A1* | 1/2008 | Rackley, III | G06Q 20/042 705/39 |
| 2008/0010298 A1 | 1/2008 | Steele et al. | |
| 2008/0052184 A1 | 2/2008 | Junger et al. | |
| 2008/0071627 A1 | 3/2008 | Junger | |
| 2009/0132392 A1 | 5/2009 | Davis et al. | |
| 2009/0132415 A1 | 5/2009 | Davis et al. | |
| 2009/0234764 A1 | 9/2009 | Friesen | |
| 2010/0125510 A1* | 5/2010 | Smith | G06Q 20/105 705/17 |
| 2010/0191570 A1* | 7/2010 | Michaud | G06Q 30/02 705/7.33 |
| 2010/0205091 A1* | 8/2010 | Graziano | G06Q 20/102 705/40 |
| 2010/0217707 A1* | 8/2010 | Phillips | G06Q 20/105 705/41 |
| 2010/0250364 A1 | 9/2010 | Song et al. | |
| 2011/0004921 A1 | 1/2011 | Homer et al. | |
| 2011/0022483 A1 | 1/2011 | Hammad | |
| 2011/0106698 A1 | 5/2011 | Isaacson et al. | |
| 2011/0201306 A1* | 8/2011 | Ali Al-Harbi | G06F 21/42 455/411 |
| 2011/0238473 A1* | 9/2011 | Sankolli | G06Q 20/32 705/14.23 |
| 2012/0022944 A1 | 1/2012 | Volpi | |
| 2012/0066262 A1 | 3/2012 | Greenberg | |
| 2012/0150643 A1 | 6/2012 | Wolfe et al. | |
| 2012/0150731 A1 | 6/2012 | Isaacson et al. | |
| 2012/0150743 A1 | 6/2012 | Isaacson et al. | |
| 2012/0191615 A1 | 7/2012 | Schibuk | |
| 2012/0239581 A1 | 9/2012 | Mosher | |
| 2012/0271712 A1* | 10/2012 | Katzin | G06Q 30/06 705/14.51 |
| 2013/0024327 A1 | 1/2013 | Nargizian | |
| 2013/0030934 A1* | 1/2013 | Bakshi | G06Q 20/40 705/18 |
| 2013/0073365 A1 | 3/2013 | McCarthy | |
| 2013/0151400 A1* | 6/2013 | Makhotin | G06Q 20/3227 705/39 |
| 2013/0332342 A1 | 12/2013 | Kasower | |
| 2013/0340052 A1 | 12/2013 | Jakobsson | |
| 2013/0346305 A1* | 12/2013 | Mendes | G06Q 20/351 705/41 |
| 2014/0164082 A1* | 6/2014 | Sun | G06Q 30/0214 705/14.16 |
| 2014/0214626 A1 | 7/2014 | Bowers et al. | |
| 2014/0244365 A1* | 8/2014 | Price | G07B 15/00 705/13 |
| 2014/0244487 A1 | 8/2014 | Seligmann et al. | |
| 2014/0279115 A1* | 9/2014 | Verma | G06Q 20/322 705/21 |
| 2015/0052064 A1* | 2/2015 | Karpenko | G06Q 20/3829 705/71 |
| 2015/0128241 A1 | 5/2015 | Jakobsson | |
| 2015/0220924 A1* | 8/2015 | Bakker | G06Q 20/4014 705/14.27 |
| 2015/0248664 A1* | 9/2015 | Makhdumi | G06Q 20/3274 235/380 |
| 2015/0339652 A1* | 11/2015 | Park | G06Q 20/32 705/39 |
| 2015/0356562 A1 | 12/2015 | Siddens et al. | |
| 2016/0239887 A1* | 8/2016 | Zhao | G06Q 30/0607 |

OTHER PUBLICATIONS

Non-Final Office Action for U.S. Appl. No. 14/195,341 dated Jul. 26, 2016, 26 pages.

Non-Final Office Action for U.S. Appl. No. 14/195,145 dated Oct. 11, 2016. 12 pages.

"Use AutoFill for credit cards, contacts, and passwords"; https://support.apple.com/guide/safari/use-autofill-ibrw1103; 2018. 2 pages.

Corcoran, Cate T., "Caught in a Cloud: Technology Revolution Reinventing Retail" WWD: Women's Wear Daily; Los Angeles vol. 199, Iss. 13 (Jan. 20, 2010): 1. (Year: 2010. 4 pages.

Dashlane; "Never forget another password"; https://www.dashlane.com/;2018. 8 pages.

Dashlane; "The most accurate way to autofill forms on the web"; https://www.dashlane.com/features/autofill; 2018. 8 pages.

Gaunt, Matt; "Deep Dive into the Payment Request API"; https://developers.google.com/web/fundamentals/payments/deep-dive-into-payment-request; Jan. 9, 2018. 53 pages.

McCormick et al.; "Payment Request API"; https://docs.microsoft.com/en-us/microsoft-edge/dev-guide/device/payment-request-api; May 24, 2017. 7 pages.

Non-Final Office Action on U.S. Appl. No. 14/195,182 dated Mar. 28, 2016, 13 pages.

\* cited by examiner

SYSTEMS AND METHODS FOR ASSISTED TRANSACTIONS USING AN INFORMATION WALLET

CROSS-REFERENCE TO RELATED PATENT APPLICATIONS

The present application claims priority to U.S. Provisional Patent Application No. 61/806,686, filed on Mar. 29, 2013 and titled "Systems and Methods for Information Storage and Communication," and U.S. Provisional Patent Application No. 61/922,468, filed on Dec. 31, 2013 and titled "Systems and Methods for Assisted Transactions Using an Information Wallet," both of which are incorporated by reference in their entireties and for all purposes.

BACKGROUND OF THE INVENTION

Individuals are often asked to provide information in connection with receiving various goods or services. For example, individuals are often asked to provide identifying information when registering or applying for a government service, such as a state-issued licenses or government benefits. Oftentimes, the information that the individual is asked to provide is the same or similar to information that the individual has been asked to provide previously. For instance, when applying for a passport, the individual may be asked to provide the same basic background information (name, address, date of birth, etc.) that the individual previously provided when applying for a driver's license or a credit card. As another example, individuals may be asked to provide similar information to a number of entities to obtain services or goods (e.g., television or internet service, utility services, etc.) when moving to a new residence. In either case, individuals may in effect be asked to provide the same information over and over again to different entities. In some cases, in the course of receiving the good or service, the individual may also receive additional information that the individual would like to access at a future date. The additional information received may inform user future decisions of the individual, such as to select a particular entity to provide a service based on the additional information. Enhanced systems and methods of facilitating such information transactions would be desirable.

SUMMARY OF THE INVENTION

One embodiment of the present disclosure relates to a system for providing information to an entity. The system includes an information wallet account associated with a user of the system, and a server having a memory and a processor. The processor is configured to receive a request for information, wherein the requested information is associated with the user, and retrieve a stored portion of the requested information from the information wallet account. If a portion of the requested information is not found within the information wallet account, the processor is configured to send a request for a remaining portion of the requested information to a user computing device of the user. The processor is also configured to send the requested information to an entity computing system associated with the entity as part of a transaction between the user and the entity, receive feedback from the entity computing system based on the transaction, and send an alert to the user computing system based on the feedback.

Another embodiment of the present disclosure relates to a method for providing information to an entity. The method is implemented by a server residing in a computing system and having a memory and a processor. The method includes receiving a request for information, wherein the requested information is associated with a user of an information wallet account, and wherein the information wallet account is stored in the computing system, and retrieving a stored portion of the requested information from the information wallet account. The method includes, if a portion of the requested information is not found within the information wallet account, sending a request for a remaining portion of the requested information to the user computing device. The method also includes sending the requested information to an entity computing system associated with the entity as part of a transaction between the user and the entity, receiving feedback from the entity computing system based on the transaction, and sending an alert to the user computing system based on the feedback.

Another embodiment of the present disclosure relates to a method implemented by a server residing in a computing system and having a memory and a processor. The method includes receiving location information from a user computing device, wherein the location information is associated with a user of the user computing device, and wherein the user is associated with an information wallet account stored in the computing system. The method also includes, based on the location information, sending an option to select a service to the user computing device, wherein the service is provided by an entity. The method also includes receiving a selection of the service from the user computing device, receiving a request for information, wherein the requested information is associated with the user, and retrieving a stored portion of the requested information from the information wallet account. The method also includes, if a portion of the requested information is not found within the information wallet account, sending a request for a remaining portion of the requested information to the user computing device. The method further includes sending the requested information to an entity computing system associated with the entity as part of a transaction between the user and the entity.

DETAILED DESCRIPTION OF THE PREFERRED EMBODIMENTS

The systems and methods, described in greater detail below, provide an information wallet system configured to receive information from a user and enable the user to communicate the information in a highly secure, convenient, efficient, time-saving, and cost-effective manner. The systems and methods may allow merchants and other businesses to reduce their reliance on technologies such as card swipe, card readers, cash machines, custom kiosks, cash registers, specialized scanners, etc. The information may be stored in the cloud and/or locally on the customer's device. The information may be stored in a financial institution computing system, exclusively or non-exclusively, and maintained by the financial institution. The information may be accessible to the individual and other entities, with the approval of the user, using a mobile device (e.g., laptop, mobile phone, tablet, etc.) or other computer devices. The systems and methods may allow a user to automatically accept or apply for goods or services using information stored within a mobile wallet account. A user or recipient may be able to store information within the mobile wallet account and automatically provide the information to an entity providing the goods or services. The systems and methods may also provide options for additional goods and services based on the information stored within the information wallet.

Figure 1:
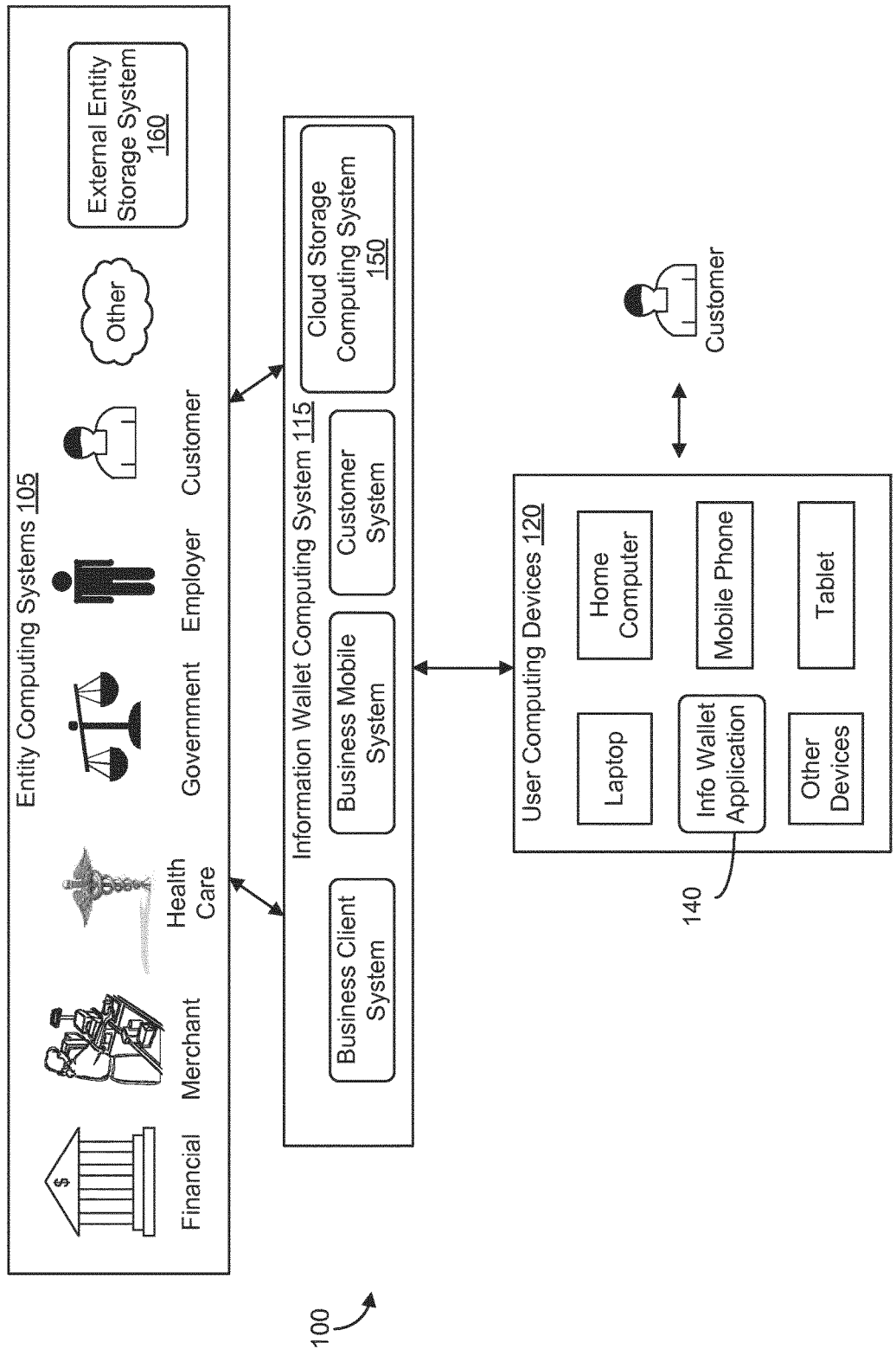
FIG. 1 is a schematic diagram of a computer-implemented information wallet system according to an example embodiment.
Figure 2:
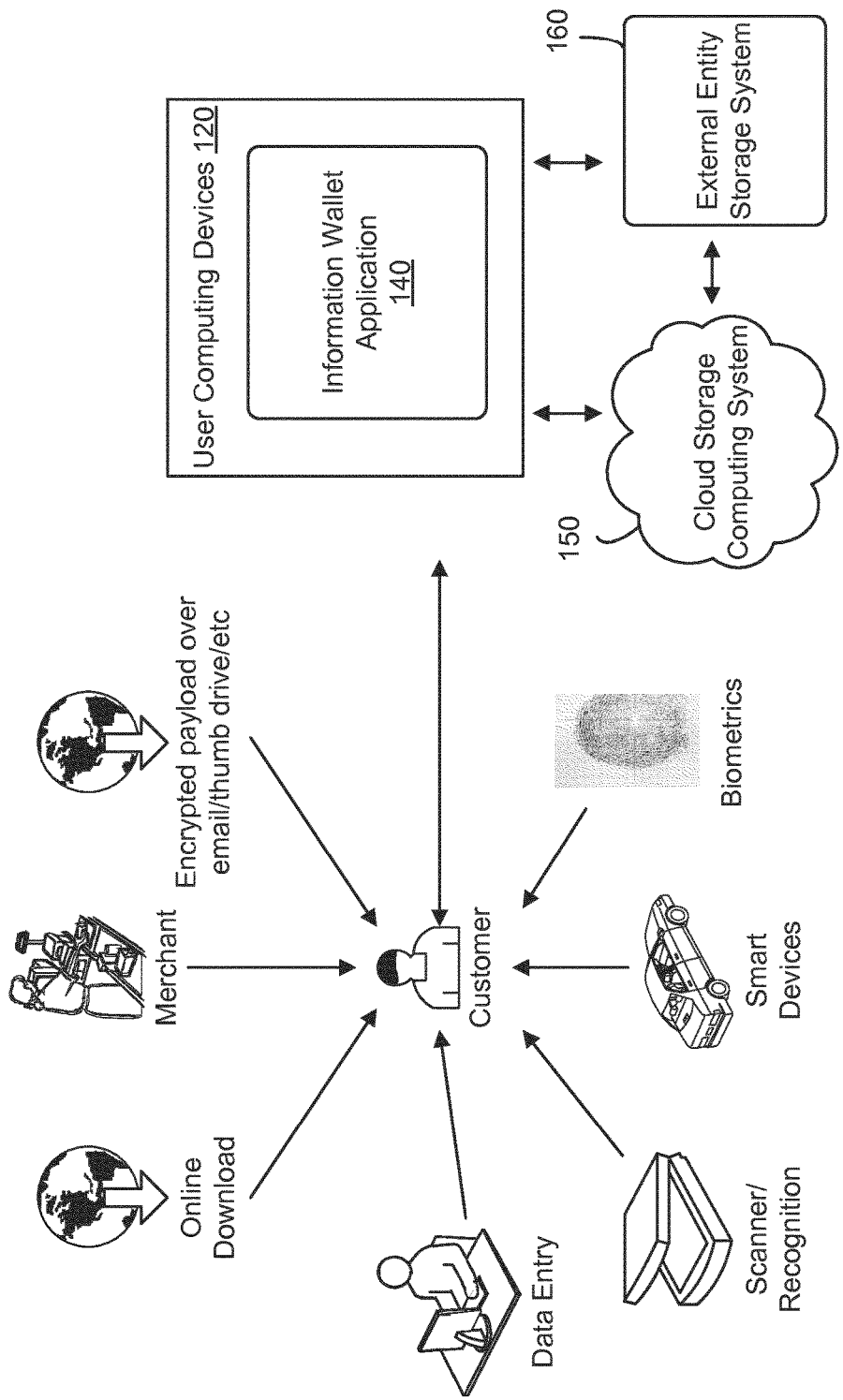
FIG. 2 is a schematic diagram of a computer-implemented information receiving system of the information wallet system in FIG. 1 according to an example embodiment.
Figure 3:
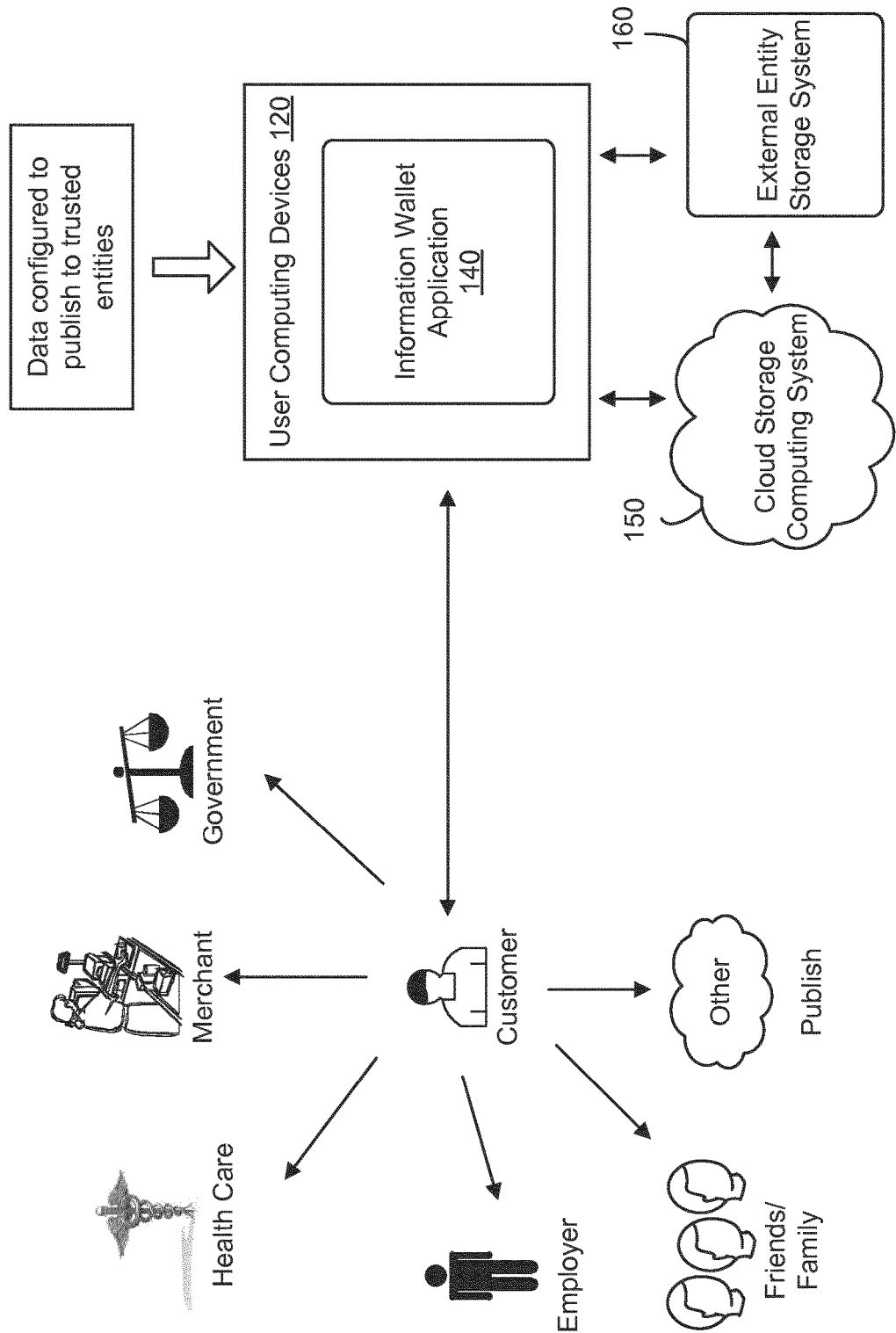
FIG. 3 is a schematic diagram of a computer-implemented information sharing system of the information wallet system of FIG. 1 according to an example embodiment.
Figure 5:
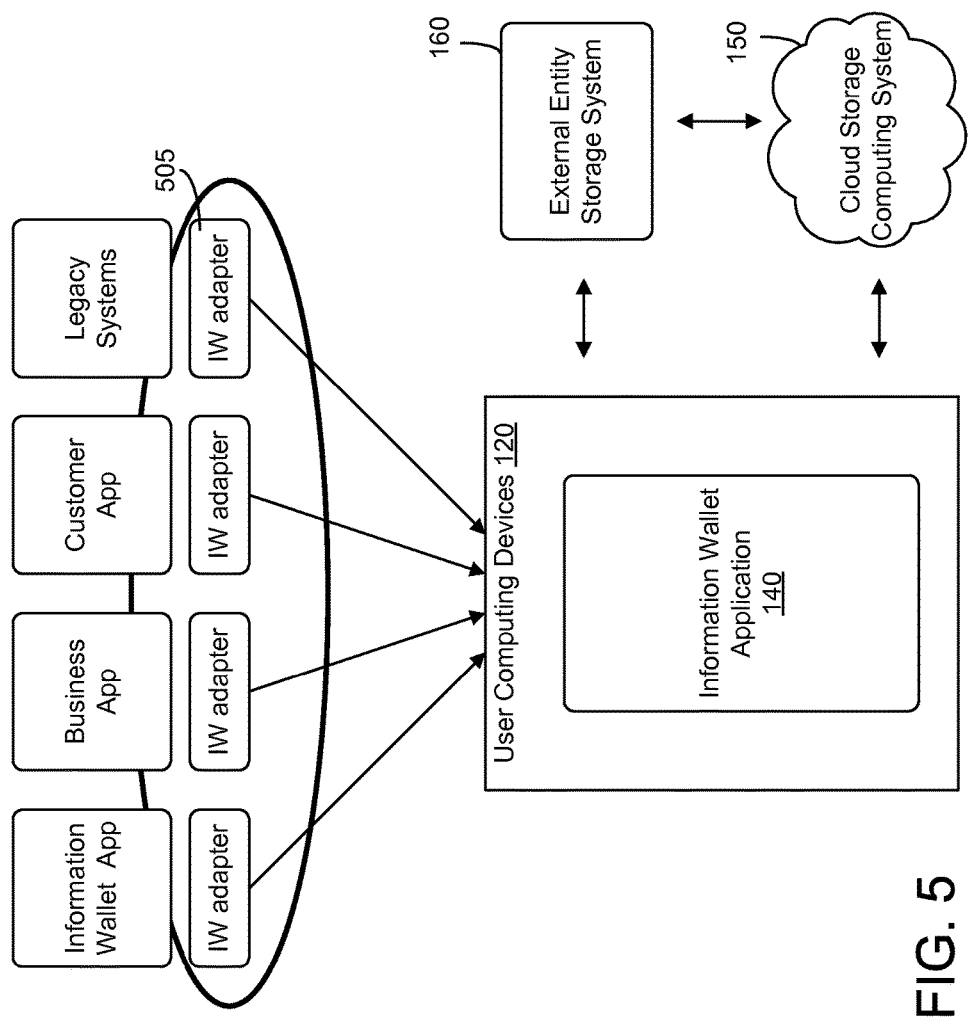
FIG. 5 is a diagram showing information synchronization between various adapters and user applications according to an example embodiment.

Referring to FIG. 1, a computer-implemented information wallet system 100 is shown that may be used by a customer (also referred throughout as a user) to set up and utilize an information wallet account using a user computing device 120 (i.e. laptop, mobile phone, tablet, or home computer). In the various embodiments, data storage and other functionality for the information wallet system 100 may include a cloud-based storage computing system 150 and/or other functionality provided by the information wallet computing system 115. The information wallet computing system 115, in one example embodiment, may be provided a financial institution computing system (e.g., a bank computing system). The user may be an individual consumer that may have one or more accounts with the financial institution and has also established an information wallet account with the financial institution. In another embodiment, the user may not have a financial account with the financial institution but may nevertheless have established an information wallet account with the financial institution. The information wallet system 100 is configured to meet the varied needs of users in the embodiments above and embodiments discussed below. In other embodiments, the information wallet system 100 may be provided by other entity computing systems 105. Other entity computing systems may comprise a second financial institution, a merchant, a health care organization, a government organization, an employer, a customer, or other entity with a computing system. The other entity computing systems 105 may store data that is accessed by the information wallet system 100 (e.g., in external entity storage systems 160 as shown in FIGS. 2, 3, and 5). The information wallet system 100 may include a link out to the data stored in the other entity computing systems 105 such that the data stored by the other entity computing systems 105 is seamlessly accessed by the information wallet computing systems 115. The information wallet computing system 115 may be used to facilitate storing information and communicating stored information to one or more entities, potentially via a user computing device 120.

Referring to FIG. 1, information wallet system 100 may include, among other systems, entity computing systems 105 (i.e. a merchant computing system and/or a financial institution computing system), an information wallet computing systems 115, a user computing device 120 (which may include a laptop, home computer, mobile phone, tablet, or any other computing devices), and cloud storage computing systems 150. The computing systems and devices 105, 115, 120, and 150 may communicate through a cloud network, which may include one or more of the Internet, cellular network, near field communication (NFC), Bluetooth connection, Wi-Fi, Wi-Max, a proprietary banking network, etc. The entity computing systems 105, information wallet computing systems 115, user computing devices 120, and cloud storage computing systems 150 may each comprise a computer system (e.g., comprising one or more processors) configured to execute instructions, send and receive data stored in non-transitory memory, and perform other operations to implement the operations and functions described herein associated with logic or processes as shown in the figures and discussed throughout the disclosure.

The entity computing systems 105 are implemented by entities that interact to exchange information with users. Such entities, as described above, may include a financial institution, a merchant of goods or services, a health care organization, a government organization, an employer, a customer, or any other entity or combination of entities. The entity computing system 105 may, for example, be provided by any entity that provides goods or services to consumers. The entities may enter into transactions with the user and/or may exchange information with the user. For example, the entity computing systems 105 may implement an Internet destination (e.g., website) where users may obtain user names/login IDs or otherwise become registered members. Registration of the users as members could allow a user and entity to connect quickly and securely, determine and share a variety of relevant information, and optimize the shared information to meet both the user and entity needs. As another example, the entity computing systems 105 may be provided at a bricks and mortar location where the user receives goods or services, such as a store, a hospital, a restaurant, a hotel, etc. The information exchanged may, for example, relate to the goods or services received by the user at the location.

The user computing devices 120 may be used by a user to create an information wallet account and interact with an entity computing system 105. The user computing devices 120 may include mobile devices such as a smart phone, portable gaming device, portable music listening device, portable digital or electronic viewing device, or another suitable wireless device. The user computing device 120 may comprise network interface logic, a display device, an input device, and an information wallet application 140. Network interface logic may include, for example, program logic that connects the user computing device 120 to the network. As described in greater detail below, for example, the user computing device 120 may display screens to prompt the user to review and/or approve data transfer requests, to request data from the user, etc. Such screens may also be used to prompt the user to specify parameters regarding the level of security to be associated with different elements of data regarding the user. For example, data requests including a mailing or physical address may be assigned a higher level of security than data requests involving an email address. Such screens are presented to the user via the display device. The display device may be interactive, for example touchscreen. An input device may be used to permit the user to initiate access to the information wallet and to facilitate sending/receiving requested information to/from the entities. In one embodiment, the input device may allow a user to access and redeem a gift stored in the information wallet system 100.

FIG. 1 shows information wallet computing system 115 disposed between the entity computing systems 105 and the user computing devices 120. In one embodiment, the information wallet computing system 115 is resides within a financial institution computing system. The information wallet computing system 115 may comprise program logic executable by and between the entity computing systems 105 and the user computing devices 120 to implement at least some of the functions described herein. As will be appreciated, the level of functionality that resides on the entity computing systems 105 or information wallet computing system 115, as opposed to the user computing devices 120, may vary depending on the implementation. The information wallet computing system 115 may include modules such as a business client system, business mobile system, and customer system. The business client system module may provide the backend support of the information wallet application disposed on a business client side. Likewise, the business mobile system and customer system modules may provide backend support of the information wallet application disposed on a business mobile device or a customer device. The information wallet computing system 115 may also host the cloud storage computing system 150.

The information wallet computing system 115 may allow the user computing devices 120 to interact with entity computing systems 105. In one embodiment, the information wallet computing system 115 facilitates the exchange of information between the user computing device 120 and the entity computing system 105. For example, the information wallet computing system 115 may receive information from a user computing device 120 and transfer that information to the entity computing system 105. In one embodiment, the information received from the user computing device 120 corresponds with a request to the information wallet computing system 115 to retrieve certain information. The information wallet computing system 115 may receive the request, access the cloud storage computing system 150, retrieve the requested information, and forward the information as requested to the entity computing system 105. In another embodiment, the same process may apply for transferring information from an entity computing system 105 to the user. The information wallet computing system 115 may receive information from an entity computing system 105 and transfer that information to a user computing device 120. The information received may correspond with a request to the information wallet computing system 115 to retrieve certain information from the cloud storage computing system 150. The information wallet computing system 115 may receive the information including the request from the entity computing system 105, access the cloud storage computing system 150, retrieve the requested information, and transfer the information to the user computing device 120. For embodiments described throughout the disclosure, any user, customer, or entity may create an information wallet account through the information wallet system 100 using an available computing device.

The cloud storage computing system 150 may store information that is provided by the user, e.g., after the information wallet is enriched by one or more of the processes shown in FIG. 2, described below. The cloud storage computing system 150 may encrypt the data regarding the user. In some embodiments, the cloud storage computing system 150 may permit an entity to access the data based on a permission or security level granted by a user. For example, if a user configures an information wallet account to allow broad permission for sharing information about vehicles owned by the user, then an entity seeking the user's vehicle information may obtain that information without waiting for further approval. The entity may solicit the information from the cloud storage computing system 150 through the information wallet computing system 115, and the information wallet computing system 115 may retrieve the information based on pre-set permission by the user. The cloud storage computing system 150 may give the user full control of the information stored by the user in the cloud storage computing system 150. The system is configured such that an outside computing system may only access information in conformance with permission and security levels set by a user.

Some of the user information may be stored in the external entity storage systems 160 of entities 105. Accordingly, some data may be stored outside of the cloud storage computing system 150 and the user computing devices 120. In these situations, the information wallet computing system 115 may include a link out to the data stored in the external entity storage systems 160. The link out may be a token that is stored in the cloud storage computing system 150 or in the information wallet application 140 running on the user computing devices 120. The link out indicates to the information wallet system 100 the location and content of the information stored the external entity storage systems 160 of entities 105 such that the data can be integrated into the user's information wallet without having to store the data in the information wallet computing system 115. For example, a user may opt not to store medical information (e.g., an MRI, X-rays, etc.) in the information wallet computing system 115, but rather in a records database of the user's medical provider. In this situation, the information wallet computing system 115 may be configured with a link out to the medical information stored in the records database of the medical provider such that that the information wallet system 100 has access to the externally stored data.

In an example embodiment, the information wallet system 100 allows interoperability between various entity computing systems 105 (e.g., external entity storage systems 160), information wallet computing systems 115, user computing devices 120, and other relevant systems. In order to provide the interoperability with each of the above listed systems, various adapters may be utilized on a plurality of systems. Adapters facilitate integrating computing systems of different technological platforms in a manner that allows different computing systems to connect with the information wallet system 100. The adapters may be implemented, for example, using plug-ins or Application Program Interfaces ("APIs"), which comprise a set of software components that add specific abilities to a larger software application. The plug-ins or APIs, in one embodiment, adapt the pre-existing enterprise computing system to connect with the information wallet system 100. The plug-ins or APIs may also enable the functionality of an application to be customized, such as an enterprise application that supports business operations of a business entity or an application (e.g., browser) executed on a user computing device 120. The application may be customized to meet any need or requirement of any particular entity, business, or customer using the information wallet system 100. For example, a hotel may have enterprise software with a plug-in installed that displays a button screen (i.e., "Request via Info Wallet") in the check-in screen. Upon the engaging the button, such as by pressing the button, the enterprise software may execute the plug-in. The plug-in may, for example, initiate the generation of a Bluetooth signal to establish Bluetooth contact with a user computing device 120. A random PIN may be verbally or textually communicated to the user for entry into the user computing device 120 in order to initiate Bluetooth pairing with the user computing device 120 of the user. The plug-in may therefore, via Bluetooth, request information from the information wallet system 100 of the user that is checking into the hotel. In other scenarios, the connection may be made by way of another type of wireless connection, such as but not limited to, Wi-Fi, WAN, 3G, 4G, NFC, etc. The plug-ins or other adapters may use a request/response protocol to communicate messages and execute code. The plug-ins or APIs may send messages in a predetermined format that contain a list of data that is requested. The user computing device 120 may receive the Bluetooth request and generate a screen requesting permission to send the requested information. The adapters may also request certain packages of data. For example, if a common adapter is developed that is used by various hotels using the same enterprise software, then all hotels may ask for the same package of data, and that information may be standardized and prepackaged to be sent each hotel. As will be appreciated, similar arrangements may be implemented in other contexts (e.g., healthcare providers, merchants, etc.).

The cloud storage computing system 150 may cooperate with the information wallet computing system 115 on the user computing device 120 to provide different levels of security to the information stored in the cloud storage computing system 150. For example, the user may configure the information wallet to provide the address and phone number of the user with a first (relatively low) level of security, to provide a credit card number of the user with a second (higher) level of security, to provide the credit card cvv value with a third (still higher) level of security, and to provide the user's social security with a fourth (even higher) level of security. As will be appreciated, any number of different levels of security may be provided. The level of security given to any particular data element may be determined as a matter of default (e.g., information wallet configuration may by default dictate that the user's social security number is given a higher level of security than the user's phone number), based on user-specified inputs (e.g., the user may be given the ability to set security on a data element by data element basis, to set security for groups of related data (e.g. health data vs. financial data), and/or to set security in another manner), etc. The level of security assigned to a specific type of information or data may alter the steps that must be taken in order for the information wallet system to relinquish the information to an outside computing system. For example, information and data with a relatively low level of security may be pre-approved for sharing by the user, and the information wallet computing system 115 may relinquish the information upon request by the entity. On the other hand, information or data assigned a higher level of security may require the information wallet computing system 115 to contact the user through the user computing device 120 and solicit authorization from the user. The authorization may be supplied by a number of ways, including, for example, an electronic signature, a pin number, a finger print, or direct user authorization through the user computing device 120. Security and/or validity of an information request is not exclusively "fixed." The informational wallet will have the capability to determine whether the "context of the transaction" is valid. Accordingly, if certain known patterns of fraud or trolling for information are detected the user may be alerted to the potential fraud or troll for data. Analytical models may be used to determine the probability of a valid or invalid data request.

As will also be appreciated, the security precautions taken in the context of a particular transaction may be determined not only based on the level of security associated with a particular information or data element, but also based on other factors, such as the identity of the entity requesting the information. For example, the user may configure the information wallet such that the user's spouse is granted access to all of the user's data, regardless of the level of security with which the data is associated. As another example, the information wallet may be configured such that the user's health care providers are given easier access to the user's health-related data, and the user's accountant is given easier access to the user's financial data. Hence, the user's approval may be prompted prior to the user's financial data being provided to the user's health care provider, but not prior to the user's financial data being provided to the user's accountant. Conversely, the user's approval may be prompted prior to the user's health-related data being provided to the user's accountant, but not prior to the user's health-related data being provided to the user's health care provider. As will be appreciated, the level of security provided may also be dependent on other factors, such as the time of day that the data is being requested (e.g., a request for data occurring in the middle of the night might be considered to be more likely to be fraudulent in some circumstances), the location of the requester (e.g., the IP address of the requester may indicate that the requester is overseas), the location of the user (e.g., the GPS signals from the user computing device 120 may indicate that the user is at a location that would not normally be associated with a request for health-related information), etc. As will be appreciated, heightened levels of security provided may also be provided in certain circumstances as a result of the operation of other fraud prevention algorithms (e.g., a pattern of requests for financial information may be identified as being unusual and therefore potentially fraudulent).

As discussed above, the action required to be taken by the user in order to approve such an information exchange may also be varied depending on the circumstances. For example, in some instances, approval may be passively granted based on the settings the user has set for their data (e.g., no affirmative action is required by the user to give the user's spouse access to the user's data). In other instances, affirmative action may be required to be taken on the part of the user. Again, the type of action may vary depending on the situation and the level of security to be provided. For example, in some instances, the approval may require the user to simply press a button labeled "approve" on the user computing device 120. In other instances, the approval may require the user entering a pin number or other secret password or code on the user computing device 120. As another example, biometric authentication, such as a body print, may be required. As will be appreciated, any number of different actions and different types of transactions may be required of a user in order to provide different levels of security in the context of particular information exchange transactions.

As will also be appreciated, in various embodiments, the information wallet system 100 may provide greater security than physical paper forms because the information is fully encrypted when exchanged and people do not have direct visual access to confidential data. The adapters on the entity computing systems 105 may provide an additional layer of protection by enforcing security settings of the information wallet computing system 115. In various embodiments, the information wallet system 100 may also provide enhanced security by providing an easier alternative to manually managing large amounts of password and authentication data. A user who is required to have a plurality of usernames and passwords for different accounts may feel compelled to catalog the plurality of passwords and associated websites on a hard copy for easy access. For example, a user may write down a list of passwords and keep the passwords within reach for easy reference, thereby impairing the security of the sensitive information. In one embodiment, after using the information wallet for over a period of time, the user may no longer have to remember a plurality of passwords for a plurality of websites or entities, etc. The user may self-authenticate using a combination of the identity of the device, biometric information acquired from the user by the user computing device 120, a single unified pin/password, or other identification methods.

In some embodiments, digital signatures may be used to certify the entity, the customer, the user, or the data. For example, driver's licenses typically contain information such as the date of birth, name, address, eye color, height, weight, donor status, etc., of the holder of the driver's license. Assuming data for the driver's license is obtained from an official government department, such as the department of motor vehicles for the state issuing the driver's license, the driver's license data may be digitally signed by the department of motor vehicles using standard certification technology. Hence, when this data is communicated to another entity computing system 105, the digital signature may be communicated with the data to certify that the data is accurate. Additionally, biometric information received from governmental authorities may be used to certify an entity, the customer, the user, or the data. For example, people are often required to submit to a background check for certain employment, which often requires going to a police station to obtain a set of fingerprints. The data collected at the police station may be used for certification and self-authentication purposes.

FIG. 2 is a diagram showing various ways in which the information wallet account (through an information wallet application 140) may be enriched with data. For example, data may be entered manually by the user via a keyboard or other suitable device. The user may enter information including a name, address, phone number, contacts, calendar, and other information. Also, image data may be received via a scanner, wherein scanned information may include, for example, a birth certificate, license, diploma, etc. Data may be received from smart devices such as cars, alarm clock, medical device, appliances, watches, phones, tablets, etc. and any application running on these devices, etc. and any "application" running on these devices. Biometric information may also be received, such as voiceprint, fingerprint, palm print, facial recognition information, etc. In some embodiments, the biometric information may be digitally signed either by a government agency, the entity that provides the cloud storage computing system 150 (e.g., a bank), or other trusted authority. In such embodiments, the information may then be used for biometric authentication. The data received from the smart devices may be stored. The data may be stored in a database. The data may be stored in standard predefined fields of the database or may be stored in customized fields as defined by the storing entity (e.g., in fields created by augmenting standard predefined fields). The data stored may be augmented with additional data or deleted. Stored data may include metadata such as a time stamp or a version number. Data may be permanently stored unless a delete command is received from the user.

Data may be additionally received as an encrypted payload over email, USB drive, wired or wireless Internet, and so on. The encryption allows the information to be transferred safely without being accessed from an unauthorized party. The information wallet account may also receive information from the context of a transaction with a merchant or entity. This may include purchase transaction information of any type, including the price of an item, the selection of a gift, additional warranty information, receipt information, etc. The information wallet application 140 may download data from online sources, such as online account information, telephone information, invoices, etc. The data from these and other sources may be used to enrich the information wallet and later made accessible to the entity computing systems 105 via the user computing devices 120.

FIG. 3 is a schematic diagram showing how the data collected in FIG. 2 can be published to various entities. As shown in FIG. 3, a user may share information with government entities, merchants, healthcare providers, employer, friends/family, and others. This information may be shared according to permissive authorizations and security levels as discussed above. FIG. 3 depicts the passive delivery of data wherein the user has configured data to publish to entities automatically, so that the user does not need to remember to publish the data. For example, if the user has a change of address, the updated address may be automatically transmitted to friends/family, employers, health care providers, merchants, the government, financial institutions, and so on. While FIG. 3 shows automatic sending of data (publishing), as will be appreciated, the information wallet system 100 may also be used for automatically receiving data (subscribing). For example, the user may subscribe to automatically receive data or messages regarding specific content from a specific entity computing systems 105. While some information may be configured to publish and subscribe automatically, other information may be configured to block automatically. For instance, the system may be configured to prevent publishing information to specific entities (i.e. credit card companies) or to block automatic subscriptions to certain entity publications (i.e. weekly e-newsletters).

Figure 4:
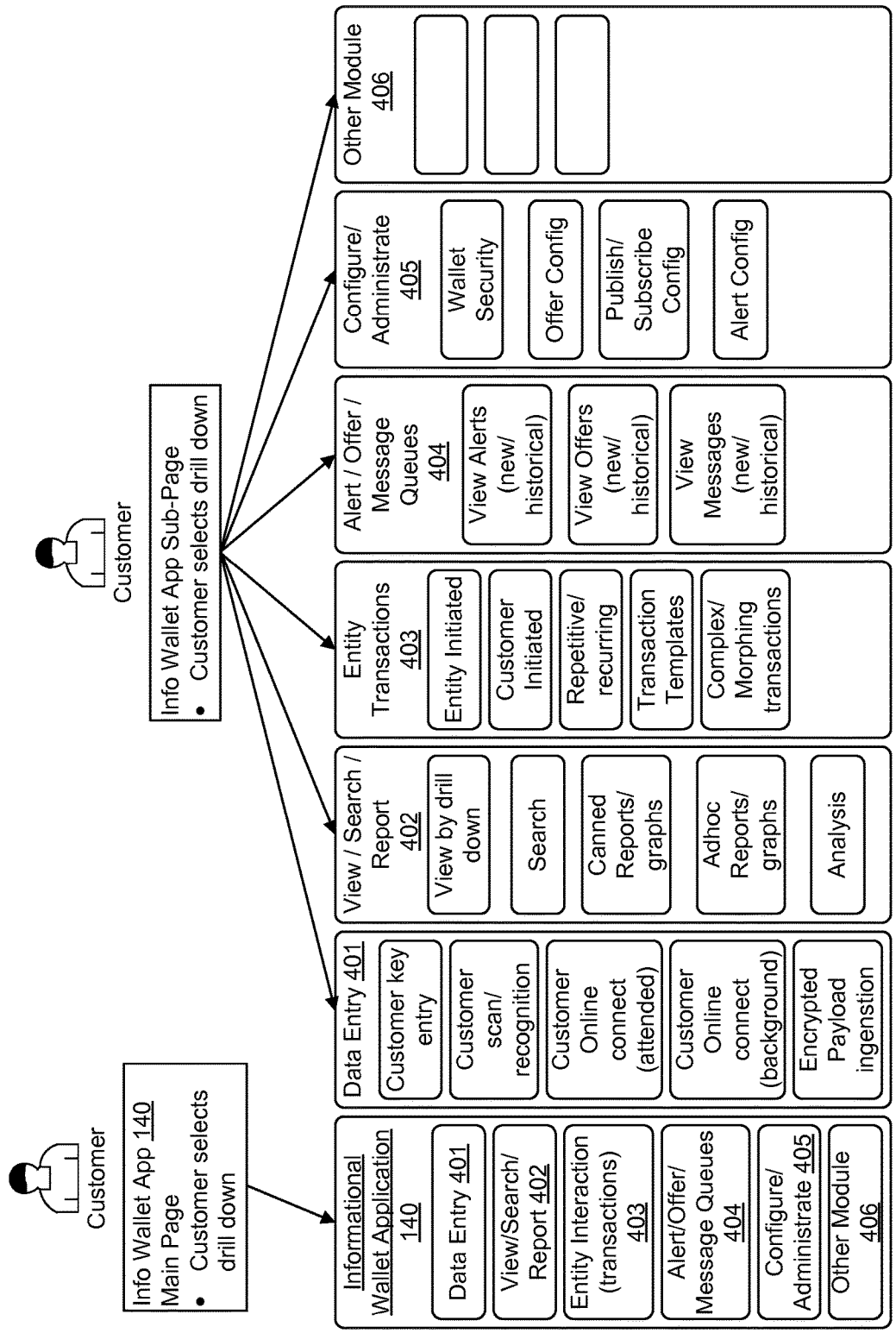
FIG. 4 is a schematic diagram of a computer-implemented information processing system from the information wallet system of FIG. 1 according to an example embodiment.

FIG. 4 is a schematic diagram showing tools provided to the user via a user information wallet application 140 operating on the user computing device 120 according to an exemplary embodiment. The tools shown in FIG. 4 provide the user with different ways of entering, updating, accessing and analyzing their data stored in the cloud storage computing system 150. As shown in FIG. 4, by way of a top-level menu level of the information wallet application 140, the user may be provided with data entry tools 401, view/search/report tools 402, entity interaction tools 403, alert/offer/message queue tools 404, configure/administrate tools 405, and other module tools 406. As shown in FIG. 4, by selecting one of the top-level menu items, the user may be taken to a drill down menu that provides further options. In one embodiment, the data entry tools 401 allow a user to enter information into the information wallet system 100 through the user computing device 120. The data may be gathered by typing information into a screen or by capturing the information via other methods, including but not limited to capturing images, a vocal recording, a video recording, etc. The data entry tool 401 may have a drill down menu that provides more functions for the application. In one embodiment, the data entry tool 401 drill down menu includes modules such as customer key entry, customer scan/recognition, customer online connect (attended) customer online connect (background), and encrypted payload module. Customer key entry and scan/recognition modules support the data and information gathering functions discussed above. The customer online connect modules, both attended and background, facilitate the functions of gathering the data and information from the customer and transferring the data and information to the cloud storage computing system 150. The encrypted payload module serves to encrypt the data prior to transferring the data from the user computing device 120 to the cloud storage computing system 150 of the information wallet computing system 115. Any of the modules and functional units discussed above or below may contain logic executable by a processor to achieve the described functions.

The view/search/report tool 402 may allow the customer or user to view, search, and retrieve information from the information wallet application 140. For example, a customer may want to view specific information that the customer previously entered into the system through the data entry tool 401. To retrieve the information, the customer may use the view/search/report tool 402 module to enter certain parameters. The backend portion of the information wallet application 140 may retrieve the data from the cloud storage computing system 150 according to the parameters entered by the customer and deliver the information to the user computing device 120. In one embodiment, the view/search/report tool 402 drill down menu includes modules such as view by drill down, search, canned reports/graphs, ad hoc reports/graphs, and analysis. These modules allow functions described above to occur, such as searching for information using certain parameters. The view by drill down menu may allow any information that the customer desires to view to be displayed in a list, which further displays related information upon engaging the list. The modules also allow the information to be presented in an organized, useful manner through avenues including graphs and reports. The information, data, reports, and graphs may be used for any type of analysis or metric functions. The analysis module may support functions such as retrieving a list of data, retrieving details behind the data, listing aspects of the data with accompanying relevant information, and so on. Analytics that may be performed may include numerical calculations, metric evaluation, a summary or analysis of numeric data (such analysis including mean, average, standard deviation, percentages, comparison, likelihood), cost projections, and so on. The user can also install applications (commonly called "apps") that specifically provide reporting and/or analysis to the user based on data in the informational wallet. For example, an application may correlate, driving habits, eating habits, and sleeping habits to health data (e.g., heart rate, blood pressure, oxygen saturation, etc.).

The entity transaction tool 403 allows the customer information wallet to interact with an entity through the information wallet system 100. In one embodiment, the entity transaction tool 403 drill down menu may include modules such as entity initiated, customer initiated, repetitive/recurring, transaction templates, and complex/morphing transactions. Through these modules, the customer may control how the customer interacts with the entity and how the entity is allowed to interact with the customer through the information wallet system 100. The entity initiated module allows a customer to control how entities initiate information requests or information transfers. The customer initiated module allows a customer to determine the manner in which it initiates transactions with an entity. For example, a customer may configure the information wallet application to solicit coupons for savings from specific entities. The repetitive/recurring module allows the customer to exact control on the interactions with the entities through the information wallet system 100 according to a specified period. For example, a customer may give recurring orders through the repetitive/recurring module (e.g. ordering medication every month). The transaction template module allows a customer to set a template on how information should be handled such that the transaction may easily occur in the future. Different entities may also have transaction templates, which could be transferred to the user computing device 120 and stored for easy use. The complex/morphing transactions facilitate transactions that are more complex than straight-forward transactions and change over time. These difficult transactions may involve greater manipulation and monitoring, and the complex/morphing transactions modules help facilitated those functions. The user may be able to write rules that govern these complex transactions. For example, the user may specify a rule that indicates that the user is to be prompted to order medication if blood pressure went over a certain threshold within the month.

In one embodiment, the alert/offer/message queues tool 404 includes a drill down menu with modules including view alerts, view offers, and view messages. These modules assists in displaying alerts from activities, offers from entities, or messages from any computing system connected with the information wallet system. The displays, offers, or messages may be new or historical. In one embodiment, the configure/administrate tool 405 contains a drill down menu with modules such as wallet security, offer configuration, publish/subscribe configuration, and alert configuration. The wallet security module controls the security of the wallet. A customer may engage this module to edit the security settings of the wallet and of information shared from the wallet. For example, the security level for certain information may be assigned using the wallet security module. The offer configuration module allows a customer to control which offers it receives from entities. This module supports the function of blocking or allowing offers received by the information wallet. The publish/subscribe configuration controls the manner in which information from the customer's information wallet account may be shared with other entity computing systems 105. Any of the modules discussed throughout the disclosure may communicate or interact with other modules in order to fulfill the required functions. For example, the publish/subscribe configuration module may interact with the wallet security module to determine what information to publish and to which entity. In one embodiment, the publish/subscribe configuration module determines the information's level of security as set in the wallet security module, then publishes the information according to the assigned security level. If information is set at a high level of security and requires a pin and thumbprint to publish, then the publish/subscribe configuration module may communicate with the wallet security module to enforce the pin and thumbprint requirement prior to publishing the information. The alert configuration modules allow a user to control when alerts may be given by the system. For example, a user may use the alert configuration module to set up an alert each time a user's social security number is solicited or shared. Other module tools 406 represent a plurality of modules that may facilitate the implementation of any desired function of the information wallet system.

FIG. 5 is a diagram showing information synchronization between various information wallet (IW) adapters 505 and user applications. Various adapters 505 may be developed to promote easy integration with business applications and systems, user devices, legacy systems, and so on. The adapters 505 may be used to enforce common data protocols and schemas. The adapters 505 may also be used to synchronize information traveling between, for example, entity computing systems 105 and the information wallet application 140 on a user computing device 120. As indicated in FIG. 5, different adapters 505 may be developed for different industries and tailored to meet specific industry needs. Adapters 505 may be developed for different software applications used by different types of businesses. Different data schemas may be developed for different domains (e.g., different industries). Again, the adapters within a common domain (e.g., healthcare) may use the same schemas to promote common data protocols and schemas. In various embodiments, the adapters may utilize both standard and non-standard schemas. For example, an entity may be permitted to add, change, and/or delete any data element with the approval of the user. Those data elements can be standard data elements within a domain or custom elements within a domain. In addition, an entity may be permitted to add a custom extension to an existing data element that is either standard or custom. In all cases, the adds, changes, and/or deletes may be versioned and saved such that the full data picture is preserved. In some situations, destructive deletes may be permitted with the approval of the user or at the request of the user. Adapters 505 may also enforce security standards of the computing systems and information transferring between the computing systems of the information wallet system 100.

Figure 6:
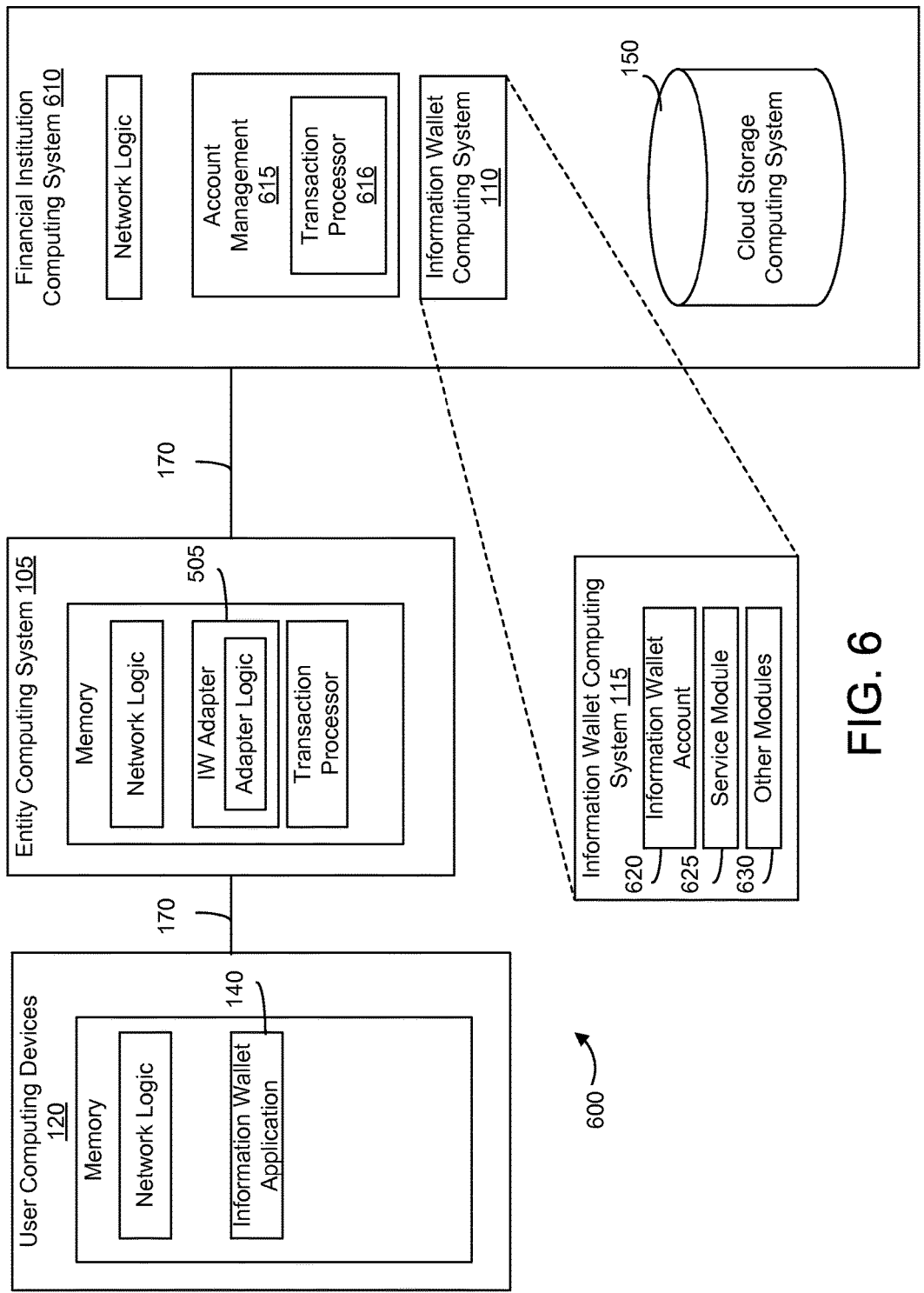
FIG. 6 is a schematic diagram of an information wallet system that may be implemented to provide information to an entity, according to an example embodiment.

FIG. 6 shows an information wallet system 600 according to an exemplary embodiment. System 600 may utilize the above described systems and methods associated with the information wallet system 100 to provide user-related information (e.g., information related to an information wallet account holder) to an entity (e.g., one or more of entities 105), such as to obtain goods or services from the entity. According to system 600, user computing device 120, entity computing system 105, and information wallet computing system 115 are connected and configured to communicate (e.g., transmit data) via network 170. The user computing device 120 includes information wallet application 140. The information wallet application 140 may include computer software with executable code and may be downloaded and installed on a device such as user device 120. The information wallet application 140 may be configured to run on any operating system and may allow secure access to the information wallet computing system 115.

The information wallet computing system 115 includes an information wallet account 620. The information wallet account 620 may be an account assigned to a user of the information wallet system 600 (e.g., a single person user, a family or other group, a business entity, etc.). The information wallet account 620 may be used to store user-related data, such as basic identifying information, financial information, health information, or other information as may be determined by the user.

The information wallet account 620, including any data within, may be accessed (e.g., entered, stored, edited, removed, etc.) by the user via the information wallet application 140 of the user device 120. The information wallet application 140 may include computer software with executable code and may be downloaded and installed on a device (e.g., user device 120, entity computing system 105, etc.).

The information wallet application 140 is configured to run on any operating system and allows secure access to the information wallet computing system 115.

According to system 600, the user device 120 communicates with the entity computing system 105 via the network 170. The entity computing system 115 may include an information wallet (IW) adapter 505 and adapter logic disposed within the IW adapter 505. For instance, the IW adapter 505 may be used to synchronize data between the entity computing system 105 and the user device 120. The user device 120 may be configured to communicate with another computing system (e.g., system 115), such as by communicating with an information wallet adapter 505 included within the system. There may be a plurality of IW adapters disposed on a plurality of computing systems within the information wallet system 600 and configured to act as secure portals in which information is sent and received between the computing systems. For instance, the adapters 505 may be installed on the entity computing system 105 to integrate the system 105 with the information wallet computing system 115 (e.g., by configuring the adapters 505 to interact securely with each other).

The information wallet adapters 505 may be configured to request and/or send certain types of information. The adapters 505 may also be configured to receive requests for information, such as from one or more computing systems within the information wallet system 600. The configuration may be written into executable code in the adapter logic and executed by a processor of the entity computing system 105, for instance. The IW adapters 505 may also contain adapter logic which allows the entity computing system 105 to connect with and operate with the user computing device 120 and the information wallet computing system 115 through the information wallet system 600. The adapter logic may also be executable by a processor and may allow the entity computing system 105, for instance, to implement a number of functions. The IW adapter 505 on the entity computing system 105 may allow an entity system to integrate into the information wallet system 600 without having to perform a full overhaul of the entity computing system 105. The IW adapters 505 may also provide a compartmentalized method of adapting the entity computing system 105 to the information wallet system 600, which may further allow greater ease in transitioning, implementing, and using the system 600. The IW adapters 505 may be configured to fully integrate with the entity computing system software, information or financial accounts of the user, and other software. The IW adapters 505 may also be configured to communicate between the cloud storage computing system 150 and the information wallet system 600. In one embodiment, the IW adapters 505 are configured to communicate with and perform functions such as synchronize information, integrate technologies, and enforce the security procedures set by a user or a computing system.

According to the system 600, the entity computing system 105 is configured to receive information from the information wallet computing system 115 (e.g., the information wallet account 620). For instance, information stored on the information wallet account 620 (e.g., entered and stored to the account 620 by the user) may be transmitted to the entity computing system 105 via network 170. The entity computing system 105 is also configured to receive information from the user device 120 via the network 170, such as by the user entering information using an input device or interface of the user device 120 (e.g., using the information wallet application 140) and transmitting the information to the entity computing system 105. As described above, the user device 120 and the entity computing system 105 may be securely integrated or otherwise communicatively connected using an IW adapter 505. The IW adapter 505 may allow a user to interact with the entity computing system 105 (e.g., using the information wallet application 140). The user may also access the information wallet account 620 in order to store, edit, delete, and otherwise manipulate the information within the account 620 using the information wallet application 140. As previously indicated, an entity may add, change, or delete any data element with the approval of the user. An entity may also add a custom extension to an existing data element that is either standard or custom. Destructive deletes may also be permitted with the approval of the user or at the request of the user.

The system 600 may also include a financial institution computing system 610. The financial institution computing system 610 may be held by a financial institution, or by another entity in other embodiments. In one embodiment, the financial institution computing system 610 is responsible for and houses the information wallet computing system 115. In this embodiment, the information wallet accounts held by the financial institution may include accounts associated with persons not having a financial account with the financial institution. However, users having both financial accounts and information wallet accounts held by the financial institution may be able to transfer information between the two types of accounts, or the two accounts may be integrated into a single account. The computing system 610 may include various storage (e.g., cloud storage computing system 150, external entity storage system 160, etc.), such as banking servers, configured to store data relating to a plurality of customer accounts, financial records, and other documents. The stored data may be backed up in multiple data centers, for example, data centers that are geographically diverse. The computing system 610 may include account management logic 615, which may include programming modules stored in a memory and configured to be executed by a processor (e.g., the processor of the banking server, etc.). The account management logic 615 may be part of the banking servers or may reside on a separate server within the computing system 610. The account management logic 615 may perform any typical functions and transactions associated with managing and maintaining a bank account for a customer, including, but not limited to opening new accounts, closing existing accounts, crediting accounts, debiting accounts, transferring funds between accounts, processing debit and credit card transactions, calculating and applying interest, calculating balances, performing account transfers, processing electronic bill payment transactions, and the like. The account management logic 615 may include transaction processing logic 616 to perform the above recited tasks. The account management logic may be configured to manage a plurality of types of accounts, including but not limited to demand deposit accounts (e.g., checking accounts, savings accounts, etc.), credit card accounts, lines of credit, and the like. The financial institution computing system 610 may include interface logic (e.g., network logic) configured to connect the financial institution computing system 610 to computing systems associated with the plurality of users (e.g., user computing devices 120, entity computing systems 105, etc.) by way of a communication network (e.g., network 170). The financial institution computing system 610 may include import logic configured to import financial statements regarding the financial accounts on a scheduled basis and/or to import user-provided documents on a user-determined timing basis.

The information wallet system 600 may be utilized to provide user-related information (e.g., information related to a user of system 600, system 100, information wallet account 620, etc.) that is requested or otherwise required by the entity computing system 105. An entity associated with the entity computing system 105 may provide value responsive to receipt of the information, such as goods (e.g., in exchange for a contract populated with user-related information), services (e.g., a contract for services, a warranty for a product, etc.), privileges (e.g., a hunting license, a driver's license, voter registration, organization membership, etc.), a removal of obligations (e.g., payment of a fine or debt), or another desired outcome of the user. The entity may include any of the entities 105 shown in FIG. 1, such as a financial institution, a merchant, a health care organization or facility, a government organization, an employer of the user, a customer of the user, and the like.

In one embodiment, which is described in further detail below in reference to FIG. 7, the entity is a government organization and the system 600 may be utilized to provide user-related information to the government organization (i.e., the entity) in order to apply or register for government services (e.g., unemployment benefits, welfare assistance, health care, etc.) or to maintain government-related registrations or licenses (e.g., passport, driver's license, etc.). For instance, the user may determine a desirable government program or service by accessing a website of the government organization or by connecting to the entity computing system 105 using the information wallet application 140. The information wallet application 140 may be configured to receive a selection of a government program or service and send a signal or indication of the selection to the entity computing system 105. In one embodiment, the entity computing system 105 provides a form or application to the user via the information wallet application 140 based on the selection and the user is able to populate the form with information using the application 140 and the user device 120. The user may populate the form by accessing the information wallet account 620 and automatically populating one or more fields with information stored within the account 620. The information wallet application 140 may be configured to send a prompt or alert to the user indicating any additional or remaining information after the stored data is utilized. In another embodiment, the entity computing system 105 is configured to send a request for specific user-related information, rather than provide a blank form. For instance, the user device 120 may be configured to receive such a request and the information wallet application 140 may be configured to display details to the user regarding the type of information requested. The user may be provided with an option to fill any requested information from the information wallet account 620 (if available) and/or to manually enter the requested information. The entity computing system 105 may also be configured to send a request directly to the information wallet computing system 115 to request any information stored within the information wallet account 620.

One or more fields of a form or application may be automatically filled with requested information using the information stored within the information wallet account 620. For instance, the information wallet computing system 115 may be configured to determine whether any requested information is stored within the account 620 upon receiving a request from the entity computing system 105 or the user device 120, automatically sending the requested information in response. In another embodiment, the information wallet computing system 115 is configured to send a prompt to the user device 120 (e.g., via the information wallet application 140) when information is requested by the entity computing system 105. The information wallet application 140 is configured to receive a response from the user and prompt the information wallet computing system 115 to send the requested information to the entity computing system 105 upon approval by the user.

In one embodiment, the system 600 is configured to submit the application or form for approval. The system 600 may be configured to determine any other requirements necessary before the form is properly filed. For instance, if a fee is required, the information wallet application 140 may be configured to access financial account information stored within the information wallet account 620 in order to access funds of the user. The information wallet application 140 may be configured to provide a prompt to the user requesting approval to transfer funds from a financial account of the user (e.g., an account connected to the information wallet account 620) in order to process or submit the application for a government service or program. Any of the above described functions or processes may be performed automatically or upon approval of the user, which may depend on user settings determined by the user and programmed into the information wallet application 140 and/or the information wallet account 620.

The system 600 may also be configured to seek related benefits and/or programs based on a user selection (e.g., based on a desired service). For instance, if the user selects an application for unemployment benefits, the system 600 may be configured to automatically seek other similar benefits or government programs, such as jobs programs, welfare programs, and the like. The system 600 may be configured to access information within the information wallet account 620 in order to tailor the additional programs or services to the user's particular needs. For instance, if the information within the information wallet account 620 indicates that the user has children, the information wallet computing system 115 may prompt the user via the information wallet application 140 to apply for a program or benefit for children or including children as a requirement of participation. The system 600 may access any information within the information wallet account 620, as authorized by the user, in order to provide relevant suggestions to the user. The information wallet application 140 may also be configured to ask the user questions in order to gain further information that is relevant for seeking additional programs or services. The suggestions may be based on user-related information, location information (e.g., as determined by a GPS within the user device 120), information accessible via the Internet, or other relevant information available to the system 600.

Once the form or application is submitted, the information wallet application 140 may also provide alerts based on the progress of the application. For instance, the information wallet application 140 may receive an indication (e.g., from the entity computing system 105) of a date for one or more decision points related to the submission when the application or form is submitted. The information wallet application 140 may be configured to provide an alert to the user at each of these points (e.g., dates), such as to prompt the user to check a status of the submission, to provide additional information related to the submission, or to take another action related to the submission for the program or service. The application 140 may also provide alerts to confirm submission of a government application, provide updates related to the information wallet application 140 or the information wallet account 620, or for another reason related to the information wallet account 620. The application 140 may also provide alerts when a program or service for which the user qualifies is available, when a submission will expire, or when another action is required. For instance, if the user is accepted and begins to receive benefits of the government program, the information wallet application 140 may be configured to send an alert or prompt to the user via the user device 120 shortly before the registration or submission is set to expire so that the user may renew the registration or submission or seek another relevant program or service. For instance, the system 600 may be used to register a vehicle with the state of the user and the information wallet application 140 may be configured to send an alert via the user device 120 when the registration should be renewed (i.e., at a time before the registration is expired). In one such embodiment, the system 600 may be configured to automatically renew the vehicle registration, including making the payment from a financial account of the user, based on preferences determined and selected by the user. Alternatively, the information wallet application 140 may request approval or permission of the user via the user device 120 prior to renewing the vehicle registration.

In one embodiment, as described in further detail below in reference to FIG. 8, the system 600 is utilized to provide assistance to a user moving to a new residence. In this embodiment, the user device 120 is configured to provide (e.g., send, transmit) location information for the new residence to the information wallet computing system 115. For instance, a user of the system 600 may enter location information via the information wallet application 140 and send the location information to the information wallet computing system 115. In one embodiment, the user device 120 includes location services and may be configured to automatically send location information to the information wallet computing system 115 based on the location services. For instance, the user device 120 may include a mobile device having a GPS function.

The information wallet computing system 115 is configured to receive the location information and provide to the user through the information wallet application 140 one or more options for services associated with the new location. For instance, the information wallet computing system 115 may determine one or more options for cable or internet service, utilities, garbage removal, and other services associated with the location. The user may select desired services from a menu provided within the information wallet application 140 and the information wallet computing system 115 may provide options for the services based on the selections. The information wallet computing system 115 may generate the options by accessing a database for each of the services, which may include a database maintained by a provider of the information wallet computing system 115. The options may be provided to include information related to the services, such as a cost for the service, potential installation times (e.g., for cable or internet), a contract duration, reviews of the associated entities, and other information. The information related to the service providers (e.g., entities) that is displayed to the user on the user device 120 may be modified by the user within the settings of the information wallet application 140.

The entity computing system 105 may also be configured to send and/or receive information through the information wallet application 140. For instance, the entity computing system 105 may send a request for information to the information wallet computing system 115 or the user computing device 120 via the information wallet application 140. The entity may select desired information using the information wallet application 140 and receive and store the information using the application 140.

The information wallet computing system 115 may also provide additional options for services based on information provided by the user (e.g., information stored within the information wallet account 620). In the illustrated embodiment, the information wallet computing system 115 includes services module 625. Services module 625 accesses information stored within the information wallet account 620 and determines services that may be desirable to the user based on the information. For instance, if the information wallet account 620 includes information related to a child of the user, the services module 625 may be configured to find one or more options for child care services near the new location. Each of the options provided (e.g., via the information wallet application 140) may include a cost of the child care service, a rating associated with the child care service (e.g., provided by other users of the information wallet computing system 115), hours for the child care service, and other information intended to enable the user to make an informed selection. As another example, the services module 625 may be configured to access financial information within the information wallet account 620, depending on the preferences of the user. The services module 625 may offer options for services near the new location based on previous financial transactions. The services module 625 may also provide options for banking services at the new location of the user. The services module 625 may be configured to receive feedback from the user regarding the options via the information wallet application 140. The services module 625 may be configured to modify or tailor the options based on the feedback provided by the user.

The information wallet computing system 115 may be configured to receive a selection of one of the options for services and the system 600 may be configured to apply or register for one or more services based on the selection. For instance, the user may provide the selection using the information wallet application 140 and an entity associated with the selected service (e.g., entity computing system 105) may be configured to receive the selection and send a request for information to the user at the user device 120. The request may be sent via the information wallet application 140 and the IW adapters 505. The request may include a form or application for the user to enter user-related information and submit as part of a transaction or exchange for services, or the request may be an explicit list of required information. In one embodiment, the user device 120 is configured to communicate with the information wallet computing system 115 to request stored information for populating the form from the entity. The information wallet computing system 115 may be configured to determine any information required by the entity (e.g., by reading the form). The information wallet computing system 115 is configured to send any of the required information that is stored within the information wallet account 620 to the entity computing system 105 or to the user device 120 to send to the entity computing system 105 with other information. The information wallet computing system 115 may be configured to request any other information required by the entity that is not found stored within the information wallet account 620. The information wallet computing system 115 may receive the remaining information from the user as input to the information wallet application 140 and send the required information to the entity. The information wallet application 140 may also compile other items or information required as part of the exchange between the user and the entity. For instance, the information wallet computing system 115 may be configured to access the user's financial account (e.g., stored within the information wallet account 620, otherwise connected to the information wallet computing system 115 such as via network 170, etc.) and transmit a payment with the required information to the entity computing system 105 if a cash deposit or other payment is required for the services. The transmission of any information or other property of the user may be subject to direct approval by the user, such as via the information wallet application 140. The user may select which functions will be performed automatically by the information wallet computing system 115 via the settings of the information wallet application 140 or the information wallet computing system 115 may send a request to the user to perform a function (e.g., via the information wallet application 140) and perform the function upon approval by the user.

In one embodiment, the information wallet computing system 115 is configured to automatically transfer one or more services to the new location. For instance, if a user's current cable or internet provider is available at the new location, the information wallet computing system 115 may be configured to automatically transfer the account to the new address provided by the user. Similarly, the information wallet computing system 115 may automatically transfer utilities, dry cleaning or laundry services, and the like.

In one embodiment, the information wallet computing system 115 includes logic for determining an optimal selection for each desired service and is configured to automatically take action to acquire the service from a chosen entity. For instance, the information wallet computing system 115 may find more than one entity offering internet service and select the entity offering the lowest price, the entity offering the lowest price per bandwidth, the entity offering the best package with phone service and/or cable television, the entity with the highest user rating, the entity closest to the new location, or based on other factors. The information wallet application 140 may be configured to receive and store within the information wallet computing system 115 user options that affect the decision-making logic for each service. The information wallet computing system 115 may take any available action, as may be determined by the user. For instance, the information wallet computing system 115 may be configured to automatically populate and file an application for services with entity computing system 105 based on information stored within the information wallet account 620, provide any required payment to the entity computing system 105 by accessing a financial account of the user, and schedule an appointment for installation or receipt of the service based on a calendar of the user stored within the information wallet account 620 or found otherwise on the user device 120. If the service may not be accepted or ordered through interaction between the entity and the information wallet computing system 115, the system 115 may be configured to provide a phone number or other contact information to the user via the information wallet application 140 or schedule an appointment with the entity based on the calendar of the user. The information wallet computing system 115 may also provide alerts related to the service via the application 140, including appointment reminders, payment reminders, and application updates or information. The system 115 may also request any other additional information from the user via the application 140. The system 115 may be configured to store any information provided by the user to the information wallet account 620.

The information wallet computing system 115 may also automatically change a user address associated with any accounts accessible by the information wallet computing system 115 (e.g., stored within the information wallet account 620). For instance, upon receiving the location information from the user (or upon approval by the user), the information wallet computing system 115 may change the address associated with a user's financial accounts, a mailing address of the user, an address provided to the user's employer, and the like. The information wallet computing system 115 may also automatically populate appropriate government forms associated with a change of address and alert the user to the forms. For instance, the information wallet computing system 115 may use information stored within the information wallet account 620 to automatically apply for a new driver's license upon the move. The information wallet computing system 115 may populate and submit a change of address form to the U.S. Postal Service. The information wallet computing system 115 may search the information wallet account 620 and either automatically change or file the appropriate paperwork to change any document having the old address. Any of the above described functions may also be subject to direct approval by the user of the information wallet account 620. In addition, any user or entity that has a publish/subscribe relationship to data within the information wallet computing system 115 (e.g., an address) may receive an automatic update when the address has been updated or otherwise modified (e.g., if the user has been set up for the feature).

Figure 7:
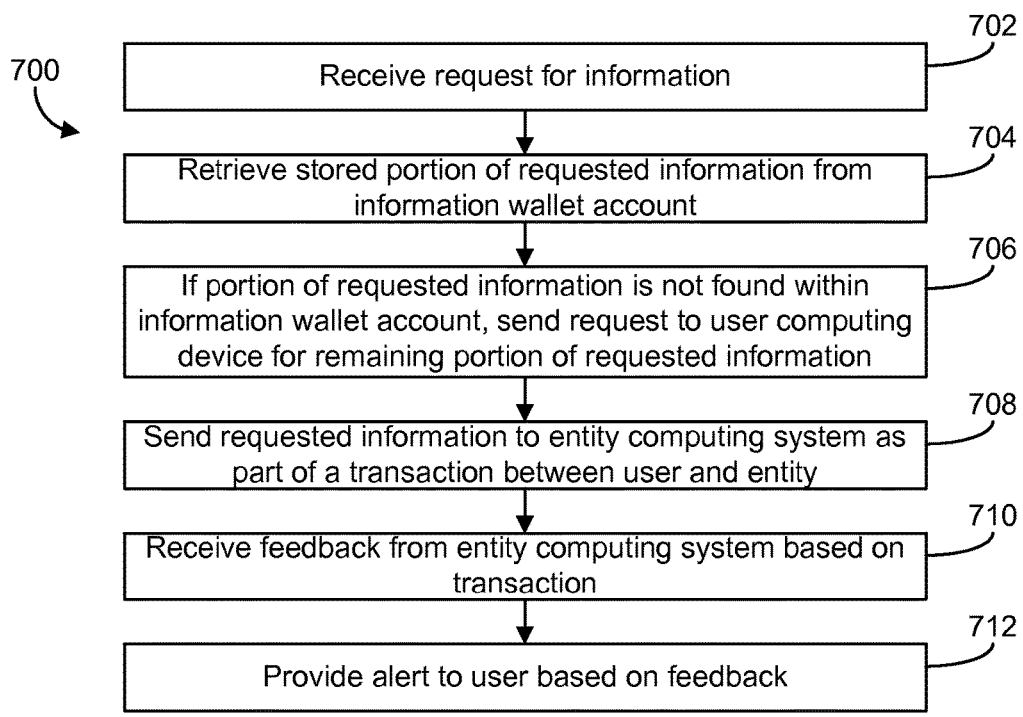
FIG. 7 is a flow chart diagram of a process for providing information to an entity to facilitate a transaction, according to an example embodiment.

Referring now to FIG. 7, a flow chart of a process 700 for providing information to an entity (e.g., entity computing system 105) is shown according to an example embodiment. The process 700 may be performed using the components of system 100 or 600. For instance, the process 700 may be performed by an information wallet computing system 115 connected to a user computing device 120 and an entity computing system 105. In one embodiment, the process 700 may be implemented by a server having a memory and a processor, such as a server stored within the information wallet computing system 115 and/or the financial institution computing system 610. The processor of the server may carry out the steps of process 700. The server may be controlled by one or more entities, such as a data storage entity (e.g., when server resides within the information wallet computing system 115) or a financial institution (e.g., when server resides within the financial institution computing system 610).

At 702, a request for information associated with a user of the information wallet account 620 is received (e.g., by the information wallet computing system 115). The information wallet account 620 may be stored on the information wallet computing system 115. The request may be sent by the entity computing system 105, such as in response to a request for services or goods. The request may also be sent by the user computing device 120, such as to access the information wallet account 620 and send the information to the entity computing system 105 as part of a transaction to receive goods and/or services. The user may send the request using the information wallet application 140 stored on the user computing device 120. At 704, a stored portion of the requested information (e.g., stored within the information wallet account 620) is retrieved from the information wallet account 620 (e.g., by the information wallet computing system 115). At 706, if a portion of the requested information is not found within the information wallet account 620, a request for a remaining portion of the requested information may be sent (e.g., by system 115) to the user computing device 120. For instance, the system 115 may send a request to the user for the user to enter any remaining information necessary to complete the transaction with the entity that was not found within the information wallet account 620. The user may also optionally choose to change or delete data that was found in the information wallet account 620. The request may be sent to the user using the information wallet application 140. The user may enter the information using an input device 120 and submit the information to either the system 115 or the system 105 using the information wallet application 140. Any information submitted to the system 115 may be stored within the information wallet account 620 for later use by the system 600. For changed information sent to the system 105, the user may choose to make that information permanent (e.g., by replacing the changed information in system 115) or to send the information only to system 105.

At 708, the information requested as part of the transaction between the user and the entity is sent (e.g., by the system 115) to the entity computing system 105. When the requested information is received by the entity computing system 105, the transaction may be completed. In one embodiment, that transaction includes further steps that may be implemented by the information wallet system 600, such as a transfer of funds (e.g., using the financial institution computing system 610), another request for information, a selection of options related to the transaction (e.g., by the user), or another function or process that may be implemented or otherwise facilitated by the components of the information wallet system 600. At 710, feedback is received from the entity computing system 105 (e.g., by system 115) based on the transaction. The feedback may include one or more dates related to completion of the transaction, an expiration date related to the transaction (e.g., an expiration date for a license, an application, a check, etc.), further requirements to complete the transaction, additional services, goods, or other transactions available from the entity, related services available from related or other entities, or other information related to the transaction and the system 600. At 712, an alert is sent to the user computing device 120 (e.g., by the system 115) based on the feedback. The alert may include a reminder that an expiration date is approaching, a reminder to make a payment, or another alert related to the transaction, the user, the entity, or the system 600.

Figure 8:
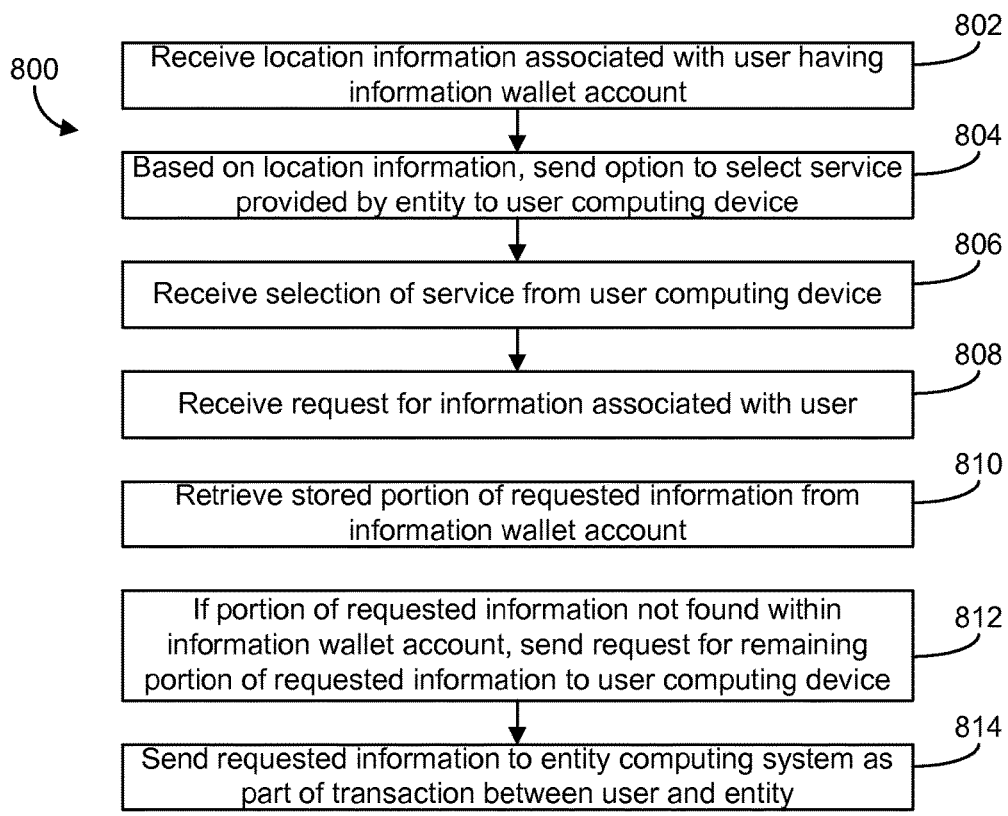
FIG. 8 is a flow chart diagram of a process for providing location-based services based on a new residence location of a user of the information wallet system, according to an example embodiment.

Referring now to FIG. 8, a flow chart of a process 800 for assisting a user associated with an information wallet account 620 with a move to a new residence is shown according to an example embodiment. The process 800 may be implemented similarly to process 700, such as by system 115, system 610, and/or by a server stored on either of the systems 115 or 610 and having a processor. At 802, location information is received from a user computing device 120. The location information is associated with a user of the user computing device 120. The user is associated with an information wallet account 620 stored in the financial institution computing system 610. The location information may be entered into the user computing device 120 via the information wallet application 140 and may be sent to the information wallet computing system 115 via network 170. The location information may also be received based on a GPS device residing on the user device 120. The location information may include a street address, a city and state, a zip code, GPS coordinates, or any other information configured to provide a location. The location information may be related to a new residence of the user.

At 804, based on the location information, an option to select a service is sent to the user computing device 120 (e.g., by the system 115). The option may be sent via the information wallet application 140 and viewable by the user using the application 140. The service may be provided by an entity (e.g., entity computing system 105), which may be included as part of the option displayed to the user. The option may include more than one service and more than one entity for each service. The user may be prompted to select a service and/or an entity in order to initiate a transaction between the user and an entity to receive a service from the entity. For instance, the option may include more than one cable provider available near the new residence location for providing cable service. The option may include other information related to the service and/or the entity, such as information provided to assist with a selection of the option. The information provided may be based on one or more preferences of the user (e.g., as stored within the information wallet application 140). In one embodiment, the option is selected automatically (e.g., by the system 115) based on the user's preferences. The transaction may also be automatically initiated (e.g., by system 115), as may be provided by the user. At 806, a selection of the service is received from the user computing device 120 (e.g., the information wallet application 140). The selection may include a service, an entity, and other information related to the transaction, such as information necessary to process or complete the transaction.

At 808, a request for information is received (e.g., by the system 115). The request may be sent by the entity computing system 105 or the user computing device 120, as described above in relation to the process 700. The requested information is associated with the user of the system 600 (e.g., user of the information wallet account 620). At 810, a stored portion of the requested information is retrieved from the information wallet account 620 (e.g., by the system 115). At 812, if a portion of the requested information is not found within the information wallet account 620, a request is sent for a remaining portion of the requested information to the user computing device 120. At 814, the requested information is sent to the entity computing system 105 associated with the entity as part of the transaction between the user and the entity.

The embodiments of the present invention have been described with reference to drawings. The drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the present invention have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments of the present invention may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present invention. Such variations will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangement of the embodiments without departing from the scope of the present invention.

What is claimed is:

1. A system for providing information to an entity, the system comprising:
    an information wallet account associated with a user of the system; and
    a server having a memory and a processor, wherein the processor is configured to:
        receive a request for information, wherein the requested information is associated with the user;
        retrieve a stored portion of the requested information from the information wallet account;
        determine that a remaining portion of the requested information is not included within the information wallet account;
        send, to an alert queue tool included in an information wallet application stored on a user computing device of the user, a first alert formatted according to a common data protocol and including a request for the remaining portion of the requested information, responsive to determining that the remaining portion of the requested information is not included within the information wallet account;
        receive, from the user computing device, the remaining portion of the requested information, the remaining portion provided via a data entry tool included in the information wallet application stored on the user computing device and received according to the common data protocol;
        send the requested information to an entity computing system associated with the entity as part of a transaction between the user and the entity;
        receive feedback from the entity computing system based on the transaction, wherein the feedback includes an expiration date related to the transaction and the processor is configured to renew the transaction prior to the expiration date; and
        send a second alert to the alert queue tool included in the information wallet application stored on the user computing device based on the feedback, wherein the entity computing system includes an information wallet adapter configured to enforce the common data protocol and at least one security standard, and to synchronize information traveling between the user computing device and the information wallet computing system.

2. The system of claim 1, wherein the information wallet computing system resides in a financial institution computing system, and further comprising account management logic stored on the machine readable storage media and configured to manage accounts respectively associated with a plurality of users, the accounts including bank accounts and information wallet accounts.

3. The system of claim 1, wherein the processor is further configured to:
    receive information from the user computing device; and
    store the received information within the information wallet account.

4. The system of claim 1, wherein the information wallet application stored on the user computing device is configured to provide an interface between the user computing device and the information wallet computing system.

5. The system of claim 1, wherein the memory includes a cloud storage computing system and the information wallet computing system is stored on the cloud storage computing system.

6. A method for providing information to an entity, the method being implemented by a server residing in a computing system and having a memory and a processor, the method comprising:
    receiving a request for information, wherein the requested information is associated with a user of an information wallet account, and wherein the information wallet account is stored in the computing system;
    retrieving a stored portion of the requested information from the information wallet account;
    determining that a remaining portion of the requested information is not included within the information wallet account;
    sending, to an alert queue tool included in an information wallet application stored on a user computing device of the user, a first alert formatted according to a common data protocol and including a request for a remaining portion of the requested information, responsive to determining that the remaining portion of the requested information is not included within the information wallet account;
    receiving, from the user computing device, the remaining portion of the requested information, the remaining portion provided via a data entry tool included in the information wallet application stored on the user computing device and received according to the common data protocol;
    sending the requested information to an entity computing system associated with the entity as part of a transaction between the user and the entity;
    receiving feedback from the entity computing system based on the transaction, wherein the feedback includes an expiration date related to the transaction;
    renewing the transaction prior to the expiration date related to the transaction;
    sending a second alert to the alert queue tool included in the information wallet application stored on the user computing device based on the feedback, wherein the entity computing system includes an information wallet adapter configured to enforce a common data protocol and at least one security standard, and to synchronize information traveling between the user computing device and the information wallet computing system.

7. The method of claim 6, wherein the computing system is held by a financial institution.

8. The method of claim 6, further comprising:
managing accounts stored in the financial institution computing system and respectively associated with a plurality of users, the accounts including bank accounts and information wallet accounts.

9. The method of claim 6, further comprising:
receiving information from the user computing device; and
storing the information within the information wallet account.

10. The method of claim 6, wherein the computing system includes a cloud storage computing system and the information wallet account is stored within the cloud storage computing system.

11. The method of claim 6, further comprising:
sending an option to the user computing device to select a second transaction, wherein the second transaction is based on the stored information.

\* \* \* \* \*